(12) United States Patent
Wang (10) Patent No.: US 6,875,818 B2
(45) Date of Patent: Apr. 5, 2005

(54) POLYMER NANO-STRINGS (75) Inventor: Xiaorong Wang, Hudson, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/345,498

(22) Filed: Jan. 16, 2003

(65) Prior Publication Data

US 2004/0143064 A1 Jul. 22, 2004

(51) Int. Cl.$^7$ .................................................. C08F 8/04
(52) U.S. Cl. .................... 525/313; 525/314; 525/332.2; 525/332.9; 525/338; 525/339
(58) Field of Search ................................. 525/313, 314, 525/332.2, 332.9

(56) References Cited

U.S. PATENT DOCUMENTS

| | | | |
|---|---|---|---|
| 4,247,434 A | 1/1981 | Lovelace et al. | |
| 4,773,521 A | 9/1988 | Chen | |
| 4,829,135 A | 5/1989 | Gunesin et al. | |
| 4,942,209 A | 7/1990 | Gunesin | |
| 5,331,035 A | 7/1994 | Hall | |
| 5,336,712 A | 8/1994 | Austgen, Jr. et al. | |
| 5,395,902 A | 3/1995 | Hall | |
| 5,487,054 A | 1/1996 | Capps et al. | |
| 5,594,072 A | 1/1997 | Handlin, Jr. et al. | |
| 5,614,579 A | 3/1997 | Roggeman et al. | |
| 5,688,856 A | 11/1997 | Austgen, Jr. et al. | |
| 5,763,551 A | 6/1998 | Wunsch et al. | |
| 5,847,054 A | 12/1998 | McKee et al. | |
| 5,883,173 A | 3/1999 | Elspass et al. | |
| 5,891,947 A | 4/1999 | Hall et al. | |
| 6,087,016 A | 7/2000 | Feeney et al. | |
| 6,147,151 A | 11/2000 | Fukumoto et al. | |
| 6,255,372 B1 | 7/2001 | Lin et al. | |
| 6,437,050 B1 | 8/2002 | Krom et al. | |

FOREIGN PATENT DOCUMENTS

| EP | 0 265 142 A2 | 4/1997 |
|---|---|---|
| WO | WO 02/31002 A1 | 4/2002 |

OTHER PUBLICATIONS

Star Polymers by Immobilizing Functional Block Copolymers, by Koji Ishizu, Tokyo Institute of Technology, Meguro–ku, Tokyo, Japan, *Star and Hyperbranched Polymers*, 1999, ISBN 0–8247–1986–7.

Formation of Worm–like Micelles from a Polystyrene–Polybutadiene–Polystyrene Block Copolymer in Ethyl Acetate, Canham et al., J.C.S. Faraday I, 1980, 76, 1857–1867.

Anomalous Behaviour of Solutions of Styrene–Butadiene Block Copolymers in Some Solvents, Tuzar et al., Makromol. Chem. 178, 22743–2746 (1977).

*Primary Examiner*—Bernard Lipman
(74) *Attorney, Agent, or Firm*—Scott A. McCollister (57) ABSTRACT

A polymer nano-string composition is provided. The polymer nano-strings can include a poly(alkenylbenzene) core, and a surface layer comprising poly(conjugated diene). The nano-strings have a mean average diameter of less than about 100 nm and a length of greater than about 1 μm.

14 Claims, 4 Drawing Sheets

POLYMER NANO-STRINGS

BACKGROUND OF THE INVENTION

The present invention relates to polymer nano-strings, methods for their preparation, and their use as, for example, additives for rubber, including natural and synthetic elastomers. The invention advantageously provides several mechanisms for surface modifications, functionalization, and general characteristic tailoring to improve performance in rubbers, elastomers, and thermoplastics.

Tires are often subjected to rough road conditions that produce repetitive, localized high-pressure pounding on the tire. These stresses can cause fatigue fracture and lead to crack formation and growth. This degradation of the tire has also been referred to as chipping or chunking of the tread surface or base material.

In an attempt to prevent this degradation, it is known to add reinforcements such as carbon black, silicas, silica/silanes, or short fibers. Silica has been found advantageous due to its ability to deflect and suppress cut prolongation, while silanes have been added to bind the silica to unsaturated elastomers. The fibers that have been added include nylon and aramid fibers.

It is also known that the addition of polyolefins to rubber compositions can provide several beneficial properties. For example, low molecular weight high density polyethylene, and high molecular weight, low density polyethylene, are known to improve the tear strength of polybutadiene or natural rubber vulcanizates. In the tire art, it has also been found that polyethylene increases the green, tear strength of carcass compounds and permits easy extrusion in calendaring without scorch. Polypropylene likewise increases the green strength of butyl rubber. Polypropylene has also been effective in raising the static and dynamic modulus of rubber, as well as its tear strength.

Although the addition of polyolefins to rubber compositions is known to provide several beneficial effects, the addition of polyolefin to tire recipes may also have a deleterious effect on other mechanical and wear properties of tires, as well as handling and ride of the tire.

Polymer nano-particles have attracted increased attention over the past several years in a variety of fields including catalysis, combinatorial chemistry, protein supports, magnets, and photonics. Similarly, vinyl aromatic (e.g. polystyrene) microparticles have been prepared for uses as a reference standard in the calibration of various instruments, in medical research and in medical diagnostic tests. Such polystyrene microparticles have been prepared by anionic dispersion polymerization and emulsion polymerization.

Nano-particles preferably are monodisperse in size and uniform in shape. However, controlling the size of nano-particles during polymerization and/or the surface characteristics of such nano-particles can be difficult. Accordingly, achieving better control over the surface composition of such polymer nano-particles also is desirable.

Nano-particles can serve as discrete particles uniformly dispersed throughout a host composition. Rubbers may be advantageously modified by the addition of various polymer compositions. The physical properties of rubber moldability and tenacity are often improved through such modifications. Of course, however, the simple indiscriminate addition of nano-particles to rubber is likely to cause degradation of the matrix material, i.e., the rubber characteristics. Moreover, it is expected that the selection of nano-particles having suitable size, material composition, and surface chemistry, etc., will improve the matrix characteristics. Polymer nano-strings may also serve as a reinforcement material for rubber compositions in order to overcome the above-mentioned drawbacks of polyolefin and silica reinforcement. Polymer nano-strings are capable of dispersing evenly throughout a rubber composition, while maintaining a degree of entanglement between the individual nano-strings, leading to improved reinforcement.

In this regard, development of polymer nano-strings having a surface layer which would be compatible with a wide variety of matrix materials is desirable because discrete strings could likely disperse evenly throughout the host to provide a uniform matrix composition. However, the development of a process capable of reliably producing acceptable nano-strings has been a challenging endeavor. Moreover, the development of a solution polymerization process producing reliable polymer nano-strings advantageously employed in rubber compositions, has been elusive.

SUMMARY OF THE INVENTION

A polymer nano-string composition including a poly(alkenylbenzene) core and a surface layer of poly(conjugated diene) is provided. The nano-strings have a mean average diameter of less than about 100 nm and a length of between about 1 and 1000 $\mu$m, the length being greater than the diameter. Preferably, the nano-strings have a length of at least about 10 $\mu$m.

A polymer nano-string including polyalkylene is provided. According to the embodiment, these nano-strings include a poly(alkenylbenzene) core and a polyalkylene surface layer including at least one alkylene monomer unit. The nano-strings have a mean average diameter less than about 100 nm and a length between about 1 and 1000 $\mu$m.

A process for forming polymer nano-strings is also provided. The process includes polymerizing alkenylbenzene monomer and conjugated diene monomer in a hydrocarbon solvent to form a block copolymer. After formation of the block copolymer, a polymerization mixture including worm-like micelles of the block copolymer is formed by adjusting the concentration of the polymerization mixture until the solid content is between about 0.01 to 10% or between about 18 to 60%. At least one crosslinking agent is then added to the polymerization mixture to form crosslinked, polymer nano-strings having a rope-like structure and including an alkenylbenzene core and a conjugated diene surface from the micelles. The poly(conjugated diene) layer is optionally hydrogenated to form nano-strings containing a poly(alkenylbenzene) core and a polycrystalline outer layer.

A rubber compound composition containing the inventive nano-strings is provided. Such compound shows its relatively high hysterisis, good tensile strength, strong resistance to creep, and high temperature resistance. A process of making the rubber compound is similarly provided.

Herein throughout, unless specifically stated otherwise:
"vinyl-substituted aromatic hydrocarbon" and "alkenylbenzene" are used interchangeably; and
"rubber" refers to rubber compounds, including natural rubber, and synthetic elastomers including styrene-butadiene rubber, ethylene propylene rubber, etc., which are known in the art.

DETAILED DESCRIPTION OF THE ILLUSTRATIVE EMBODIMENTS

GENERAL NANO-PARTICLE PROCESS OF FORMATION

This application incorporates by reference U.S. Pat. No. 6,437,050, U.S. Ser. No. 10/038,748 (filed Dec. 31, 2001) and Ser. No. 10/223,393 (filed Aug. 19, 2002).

One exemplary polymer nano-string of the present invention is formed from diblock copolymer chains having a poly(conjugated diene) block and a poly(alkenylbenzene) block. The poly(alkenylbenzene) blocks may be crosslinked to form the desired nano-strings. The nano-strings have diameters—expressed as a mean average diameter—that are preferably less than about 100 nm, more preferably less than about 75 nm, and most preferably less than about 50 nm. The nano-strings have a rope-like shape, with a length of between about 1 and 1000 $\mu$m, more preferably between about 2 and 100 $\mu$m. The nano-strings preferably retain their discrete nature with little or no polymerization between strings. The nano-particles preferably are substantially monodisperse and uniform in shape.

The nano-stings preferably have a high glass-transition temperature ($T_g$), contributing to the improved reinforcement capabilities. Preferably, the $T_g$ is between about 50 and 220° C., more preferably between about 90 and 200° C.

The nano-strings are preferably formed by dispersion polymerization, although emulsion polymerization is also contemplated. Hydrocarbons are preferably used as the dispersion solvent. Suitable solvents include aliphatic hydrocarbons, such as pentane, hexane, heptane, octane, nonane, decane, and the like, as well as alicyclic hydrocarbons, such as cyclohexane, methyl cyclopentane, cyclooctane, cyclopentane, cycloheptane, cyclononane, cyclodecane, and the like. These hydrocarbons may be used individually or in combination. However, as more fully described herein below, selection of a solvent in which one polymer forming the nano-particles is more soluble than another polymer forming the nano-particles is beneficial to micelle formation.

With respect to the monomers and solvents identified herein, nano-strings can be formed by maintaining a temperature and concentration that is favorable to polymerization of the selected monomers in the selected solvent(s). Preferred temperatures are in the range of about −40 to 250° C., with a temperature in the range of about 0 to 150° C. being particularly preferred. As described in more detail below, the interaction of monomer selection, temperature, and solvent facilitates the formation of diblock polymers which form worm-like micelles and ultimately the desired polymer nano-strings.

According to one embodiment of the invention, a diblock copolymer is formed of vinyl aromatic hydrocarbon monomers and conjugated diene monomers in a hydrocarbon solvent. The diblock copolymer contains at least a first block that is substantially soluble in the hydrocarbon solvent, preferably a conjugated diene monomer, and a second block which is less soluble in the hydrocarbon solvent, preferably a vinyl-substituted aromatic hydrocarbon monomer. Moreover, in one preferred embodiment, a vinyl-substituted aromatic hydrocarbon monomer is chosen, the polymer of which is insoluble in the dispersion solvent.

As is known in the art, such a diblock copolymer may be formed by living anionic polymerization, in which a vinyl-substituted aromatic hydrocarbon monomer is added to a completely polymerized conjugated diene monomer. Another method of forming substantially diblock copolymers is the living anionic copolymerization of a mixture of a conjugated diene monomer and a vinyl-substituted aromatic hydrocarbon monomer in a hydrocarbon solvent, particularly, in the absence of certain polar additives, such as ethers, tertiary amines, or metal alkoxides which could otherwise effect the polymerization of the separately constituted polymer blocks. Under these conditions, the conjugated diene generally polymerizes first, followed by the polymerization of the vinyl-substituted aromatic hydrocarbon. Of course, certain advantages, as described below, may be achieved via a random polymerization of at least one block of the polymer.

Nonetheless, it is generally preferred that a conjugated diene block polymerize first, followed by a vinyl-substituted aromatic, positioning the living end of the polymerizing polymer on the vinyl aromatic block to facilitate later crosslinking.

Such copolymers, formed by either method, are believed to aggregate to form micelle-like structures, with for example, the vinyl-substituted aromatic blocks directed toward the center of the micelle and the conjugated diene blocks extending as tails therefrom. By maintaining a relatively higher ratio of vinyl-substituted aromatic block to conjugated diene, a worm-like micelle shape is formed. The micelle formation may also be controlled by the maintenance of favorable solids content and favorable polymerization temperatures. For example, a further hydrocarbon charge may be made to control the solids content of the polymerization mixture. A preferred solids content is between about 0.01 and 50%, with a solids content between about 0.1–10% or about 18 to 60% being more preferred. The control of the solids content within the desirable range is believed to help achieve formation of the desired worm-like shape of the micelles. Moreover, these steps may be used to take advantage of the general insolubility of the vinyl-aromatic blocks. An exemplary temperature range for micelle formation is between about 40 and 150° C., more preferably between about 40 and 120° C., and most preferably between about 50 and 100° C.

After the micelles have formed, additional conjugated diene monomer and/or vinyl-substituted aromatic hydrocarbon monomer can be added to the polymerization mixture as desired.

Figure 1:
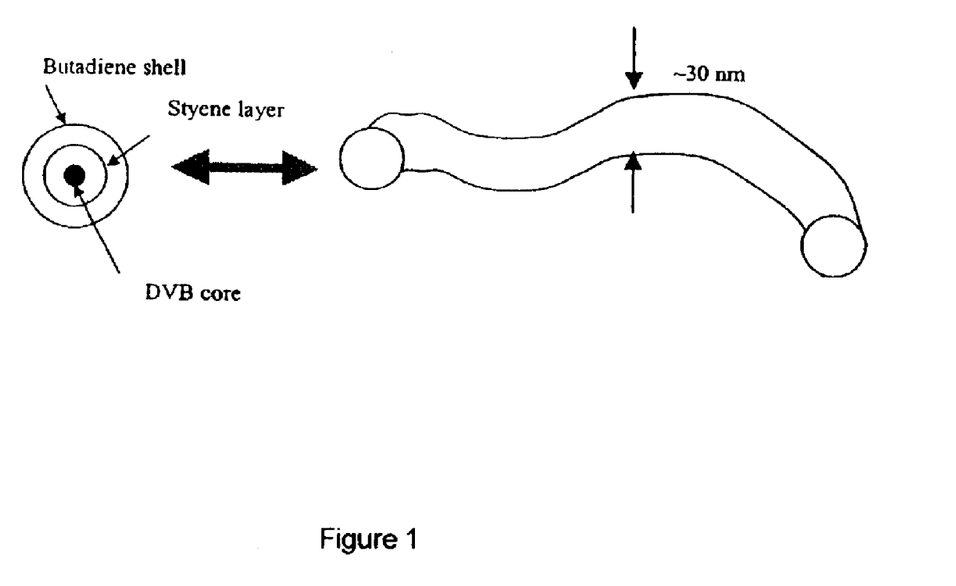
FIG. 1 is a schematic illustration of the design structure of a nano-string and a cross-section view thereof, according to the present invention.

After formation of the micelles, a cross-linking agent is added to the polymerization mixture. Preferably, a crosslinking agent is selected which has an affinity for the vinyl-substituted aromatic hydrocarbon monomer blocks and migrates to the center of the micelles due to its compatibility with those monomer units and initiator residues present in the center of the micelle and its relative incompatibility with the dispersion solvent and monomer units present in the outer layer of the micelle. The crosslinking agent crosslinks the center core of the micelle (i.e. alkenylbenzene) to form the derived polymer nano-strings. Consequently, nano-strings are formed from the micelles with a core including, for example, cross-linked styrene monomer units, a styrene monomer unit layer and a shell layer including, for example butadiene monomer units (see FIG. 1).

The conjugated diene monomers contemplated for the diblock copolymer are those soluble in non-aromatic hydrocarbon solvents. $C_4$–$C_8$ conjugated diene monomers are the preferred. Exemplary conjugated diene monomers include 1,3-butadiene, isoprene, and 1,3-pentadiene.

Vinyl-substituted aromatic hydrocarbon monomers include styrene, α-methyl-styrene, 1-vinyl naphthalene, 2-vinyl naphthalene, vinyl toluene, methoxystyrene, t-butoxystyrene, and the like, as well as alkyl, cycloalkyl, aryl, alkaryl, and aralkyl derivatives thereof, in which the total number of carbon atoms in the combined hydrocarbon is generally not greater than about 18, as well as any di- or tri-vinyl substituted aromatic hydrocarbons, and mixtures thereof.

The diblock copolymer preferably has a $M_w$ of about 5,000 to about 200,000, more preferably between about 10,000 and about 100,000. A typical diblock polymer will be comprised of about 5 to 95% by weight conjugated diene and about 95–5% by weight vinyl-substituted aromatic hydrocarbon, more preferably about 20–80% by weight, and most preferably 40–60% by weight of each contributed monomer type. However, to form the worm-like micelle structure, it may be beneficial to use more by weight vinyl-substituted aromatic hydrocarbon than conjugated diene. This preference is not absolute as solvent selection, temperature of reaction and solids content, as outlined above, can also contribute to the formation of worm-like micelles.

The micelle formed by the polymerization of vinyl-substituted aromatic hydrocarbons and conjugated diene monomers is preferably crosslinked to enhance the permanence of shape and size of the resultant nano-strings. Preferred crosslinking agents are di- or tri-vinyl-substituted aromatic hydrocarbons. However, crosslinking agents which are at least bifunctional, wherein the two functional groups are capable of reacting with vinyl-substituted aromatic hydrocarbon monomers are acceptable. A preferred crosslinking agent is divinylbenzene (DVB).

Without being bound by theory, it is believed that an exemplary worm-like micelle will be comprised of one hundred to five billion diblock polymers yielding, after crosslinking, a nano-string having a diameter between about 1 and 100 nm and a length between about 1 and 1000 μm.

A 1,2-microstructure controlling agent or randomizing modifier is optionally used to control the 1,2-microstructure in the conjugated diene contributed monomer units, such as 1,3-butadiene, of the nano-strings. Suitable modifiers include hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2] octane, diethyl ether, triethylamine, tri-n-butylamine, tri-n-butylphosphine, p-dioxane, 1,2 dimethoxy ethane, dimethyl ether, methyl ethyl ether, ethyl propyl ether, di-n-propyl ether, di-n-octyl ether, anisole, dibenzyl ether, diphenyl ether, dimethylethylamine, bix-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), bistetrahydrofuryl propane, and the like. A mixture of one or more randomizing modifiers also can be used. The ratio of the modifier to the monomers can vary from a minimum as low as 0 to a maximum as great as about 400 millimoles, preferably about 0.01 to about 3000 millimoles, of modifier per hundred grams of monomer currently being charged into the reactor. As the modifier charge increases, the percentage of 1,2-microstructure (vinyl content) increases in the conjugated diene contributed monomer units in the surface layer of the nano-strings. The 1,2-microstructure content of the conjugated diene units is preferably between about 1 and 99%, more preferably between about 5 and 95%.

STRUCTURAL MODIFICATIONS

In an alternative embodiment, the surface layer of the polymer nano-strings includes a copolymer including at least one alkenylbenzene monomer unit and at least one conjugated diene monomer unit. The copolymer may be random or ordered. Accordingly, the surface layer may include an SBR rubber. Herein throughout, references to a poly (conjugated diene) surface layer are understood to include copolymers of the type described here.

The density of the poly (conjugated diene) surface layer of the nano-strings may be controlled by manipulating the ratio of diblock to mono-block polymer chains. This ratio may be manipulated by altering the amount of initiator added during each step of the polymerization process. For example, a greater amount of initiator added during the polymerization of the conjugated diene monomer than added during the polymerization of the alkenylbenzene monomer would favor diblock formation over mono-block formation, resulting in a high density surface layer. Conversely, a greater amount of initiator added during the polymerization of the alkenylbenzene monomer than added during the polymerization of the conjugated diene monomer would favor mono-block formation over diblock formation, resulting in a low-density surface layer. The ratio of mono-blocks to diblocks can be from 1 to 99, preferably 10 to 90, more preferably 20 to 80.

HYDROGENATION OF A NANO-STRING SURFACE LAYER

After crosslinking, the polydiene blocks may be hydrogenated to form a modified surface layer. A hydrogenation step may be carried out by methods known in the art for hydrogenating polymers, particularly polydienes. A preferred hydrogenation method includes placing the crosslinked nano-strings in a hydrogenation reactor in the presence of a catalyst. After the catalyst has been added to the reactor, hydrogen gas ($H_2$) is charged to the reactor to begin the hydrogenation reaction. The pressure is adjusted to a desired range via addition of $H_2$, preferably between about 10 and 3000 kPa, more preferably between about 50 and 2600 kPa. $H_2$ may be charged continuously or in individual charges until the desired conversion is achieved. Preferably, the hydrogenation reaction will reach at least about 20% conversion, more preferably greater than about 85% conversion. The conversion reaction may be monitored by $H^1$ NMR.

Preferred catalysts include known hydrogenation catalysts such as Pt, Pd, Rh, Ru, Ni, and mixtures thereof. The catalysts may be finely dispersed solids or absorbed on inert supports such as carbon, silica, or alumina. Especially preferred catalysts are prepared from nickel octolate, nickel ethylhexanoate, and mixtures thereof.

The surface layer formed by an optional hydrogenation step will vary depending on the identity of the monomer units utilized in the formation of the nano-string surface layer, particularly the poly (conjugated diene) blocks. For example, if the poly(conjugated diene) block contains 1,3-butadiene monomer units, the resultant nano-string layer after hydrogenation will be a crystalline poly(ethylene) layer. In another embodiment, a layer may include both ethylene and propylene units after hydrogenation if the non-hydrogenated poly (conjugated diene) block contains isoprene monomer units. It should be noted that the non-hydrogenated poly (conjugated diene) block may contain a mixture of conjugated diene monomer units, or even alkenylbenzene units, resulting in a mixture of monomer units after hydrogenation.

INITIATORS AND FUNCTIONALIZED NANO-STRINGS

The present inventive process is preferably initiated via addition of anionic initiators that are known in the art as useful in the copolymerization of diene monomers and vinyl aromatic hydrocarbons. Exemplary organo-lithium catalysts include lithium compounds having the formula $R(Li)_x$, wherein R represents a $C_1$–$C_{20}$ hydrocarbyl radical, preferably a $C_2$–$C_8$ hydrocarbyl radical, and x is an integer from 1 to 4. Typical R groups include aliphatic radicals and cycloaliphatic radicals. Specific examples of R groups include primary, secondary, and tertiary groups, such as n-propyl, isopropyl, n-butyl, isobutyl, t-butyl, etc.

Specific examples of exemplary initiators include ethyllithium, propyllithium, n-butyllithium, sec-butyllithium, tert-butyllithium, and the like; aryllithiums, such as phenyllithium, tolyllithium, and the like; alkenyl-lithiums such as vinyllithium, propenyllithium, and the like; alkylene lithium such as tetramethylene lithium, pentamethylene lithium, and the like. Among these, n-butyllithium, sec-butyllithium, tert-butyllithium, tetramethylene lithium, and mixtures thereof are preferred. Other suitable lithium initiators include one or more of: p-tolyllithium, 4-phenylbutyl lithium, 4-butylcyclohexyl lithium, 4-cyclohexylbutyl lithium, lithium dialkyl amines, lithium dialkyl phosphines, lithium alkyl aryl phosphine, and lithium diaryl phosphines.

Functionalized lithium initiators are also contemplated as useful in the present copolymerization. Preferred functional groups include amines, formyl, carboxylic acids, alcohol, tin, silicon, silyl ether and mixtures thereof.

Especially preferred initiators are amine-functionalized initiators, such as those that are the reaction product of an amine, an organo lithium and a solubilizing component. The initiator has the general formula:

(A)Li(SOL)$_y$ where y is from about 1 to about 3; SOL is a solubilizing component selected from the group consisting of hydrocarbons, ethers, amines or mixtures thereof; and, A is selected from the group consisting of alkyl, dialkyl and cycloalkyl amine radicals having the general formula:

and cyclic amines having the general formula:

where $R^1$ is selected from the group consisting or alkyls, cycloalkyls or aralkyls having from 1 to about 12 carbon atoms, and $R^2$ is selected from the group consisting of an alkylene, substituted alkylene, oxy- or N-alkylamino-alkylene group having from about 3 to about 16 methylene groups. An especially preferred functionalized lithium initiator is hexamethylene imine propyllithium.

Tin functionalized lithium initiators may also be preferred as useful in the present invention. Suitable tin functionalized lithium initiators include tributyl tin lithium, triocty tin lithium, and mixtures thereof.

Anionic initiators generally are useful in amounts ranging from about 0.01 to 60 millimoles per hundred grams of monomer charge.

A nano-string including diblock copolymers initiated with a functionalized initiator may include functional groups on the surface of the nano-string. For example, when block polymers are initiated by hexamethylene imine propyllithium, the initiator residue remaining at the beginning of the polymer chain will contain an amine group. Once the polymer chains have aggregated and have been crosslinked, the resultant nano-strings will contain amine groups on or near the nano-string surface.

An exemplary nano-string formed from copolymers initiated by a functionalized tin lithium initiator may have a crosslinked alkenylbenzene core, for example polystyrene, and a surface layer including at least a poly(conjugated diene), for example 1,3-butadiene. The surface layer will also include a functionalized initiator residue at the individual chain ends (e.g., tin).

POLYMER NANO-STRING APPLICATIONS

A variety of applications are contemplated for use in conjunction with the rope-like nano-strings of the present invention. Furthermore, the several mechanisms described herein for modifying the polymer nano-strings render them suitable for different applications. All forms of the present inventive nano-strings are, of course, contemplated for use in each of the exemplary applications and all other applications envisioned by the skilled artisan.

GENERAL RUBBER

After the polymer nano-strings have been formed, they may be blended with a rubber to improve the physical characteristics of the rubber composition. Nano-strings are useful modifying agents for rubbers because they are capable of dispersing uniformly throughout the rubber composition, resulting in uniformity of physical characteristics. Furthermore, certain of the present polymer nano-strings are advantageous because the surface layer of poly (conjugated diene), especially vinyl-modified poly (conjugated diene), is capable of bonding with the rubber matrix due to the accessibility of the double bonds in the poly(conjugated diene).

The present polymer nano-strings are suitable for modifying a variety of rubbers including, but not limited to, random styrene/butadiene copolymers, butadiene rubber, poly(isoprene), nitrite rubber, polyurethane, butyl rubber, EPDM, and the like. Advantageously, the inclusion of the present nano-strings have demonstrated rubbers having improved tensile and tear strength of at least about 30% over the base rubber.

Furthermore, nano-strings with hydrogenated surface layers may demonstrate improved compatibility with specific rubbers. For example, nano-strings including a hydrogenated polyisoprene surface layer may demonstrate superior bonding with and improved dispersion in an EPDM rubber matrix due to the compatibility of hydrogenated isoprene with EPDM rubber.

Additionally, nano-strings with copolymer surfaces may demonstrate improved compatibility with rubbers. The copolymer tails with the surface layer of the nano-strings may form a brush-like surface. The host composition is then able to diffuse between the tails allowing improved interaction between the host and the nano-strings.

HARD DISK TECHNOLOGY

Hydrogenated nano-strings prepared in accordance with the present invention may also find application in hard disk technology.

Disk drive assemblies for computers traditionally include a magnetic storage disk coaxially mounted about a spindle apparatus that rotates at speeds in excess of several thousand revolutions per minute (RPM). The disk drive assemblies also include a magnetic head that writes and reads information to and from the magnetic storage disk while the magnetic disk is rotating. The magnetic head is usually disposed at the end of an actuator arm and is positioned in a space above the magnetic disk. The actuator arm can move relative to the magnetic disk. The disk drive assembly is mounted on a disk base (support) plate and sealed with a cover plate to form a housing that protects the disk drive assembly from the environmental contaminant outside of the housing.

Serious damage to the magnetic disks, including loss of valuable information, can result by introducing gaseous and particulate contaminates into the disk drive assembly housing. To substantially prevent or reduce the introduction of gaseous and particulate contaminants into the disk drive housing, a flexible sealing gasket is disposed between the disk drive mounting base (support) plate and the disk drive assembly housing or cover plate. A sealing gasket is usually prepared by punching out a ring-shaped gasket from a sheet of cured elastomer. The elastomeric gasket obtained is usually attached to the base plate of the disk drive assembly mechanically, such as affixing the gasket with screws, or adhesives. The hydrogenated nano-strings, when compounded with a polyalkylene and a rubber, demonstrate a tensile strength comparable to that necessary in hard disk drive compositions.

THERMOPLASTIC GELS

Nano-strings prepared in accord with the present invention, whether hydrogenated or non-hydrogenated may also be blended with a variety of thermoplastic elastomers, such as SEPS, SEBS, EEBS, EEPE, polypropylene, polyethylene, and polystyrene. For example, nano-particles with hydrogenated isoprene surface layers may be blended with a SEPS thermoplastic to improve tensile strength and thermostability. These blends of thermoplastic elastomer and nano-particles would typically be extended as known in the art. For example, suitable extenders include extender oils and low molecular weight compounds or components. Suitable extender oils include those well known in the art such as naphthenic, aromatic and paraffinic petroleum oils and silicone oils.

Examples of low molecular weight organic compounds or components useful as extenders in compositions of the present invention are low molecular weight organic materials having a number-average molecular weight of less than 20,000, preferably less than 10,000, and most preferably less than 5,000. Although there is no limitation to the material which may be employed, the following is a list of examples of appropriate materials:

(1) Softening agents, namely aromatic naphthenic and parraffinic softening agents for rubbers or resins;
(2) Plasticizers, namely plasticizers composed of esters including phthalic, mixed pthalic, aliphatic dibasic acid, glycol, fatty acid, phosphoric and stearic esters, epoxy plasticizers, other plasticizers for plastics, and phthalate, adipate, scbacate, phosphate, polyether and polyester plasticizers for NBR;
(3) Tackifiers, namely coumarone resins, coumaroneindene resins, terpene phenol resins, petroleum hydrocarbons and rosin derivative;
(4) Oligomers, namely crown ether, fluorine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-a-olefins;
(5) Lubricants, namely hydrocarbon lubricants such as paraffin and wax, fatty acid lubricants such as higher fatty acid and hydroxy-fatty acid, fatty acid amide lubricants such as fatty acid amide and alkylene-bisfatty acid amide, ester lubricants such as fatty acid-lower alcohol ester, fatty acid-polyhydrie alcohol ester and fatty acid-polyglycol ester, alcoholic lubricants such as fatty alcohol, polyhydric alcohol, polyglycol and polyglycerol, metallic soaps, and mixed lubricants; and,
(6) Petroleum hydrocarbons, namely synthetic terpene resins, aromatic hydrocarbon resins, aliphatic hydrocarbon resins, aliphatic or alicyclic petroleum resins, polymers of unsaturated hydrocarbons, and hydrogenated hydrocarbon resins.

Other appropriate low-molecular weight organic materials include latexes, emulsions, liquid crystals, bituminous compositions, and phosphazenes. One or more of these materials may be used in as extenders.

TIRE RUBBER

One application for nano-string containing rubber compounds is in tire rubber formulations.

Vulcanizable elastomeric compositions of the invention can be prepared by mixing a rubber, a nano-string composition, with a reinforcing filler comprising silica, or a carbon black, or a mixture of the two, a processing aid and/or a coupling agent, a cure agent and an effective amount of sulfur to achieve a satisfactory cure of the composition.

The preferred rubbers are conjugated diene polymers, copolymers or terpolymers of conjugated diene monomers and monovinyl aromatic monomers. These can be utilized as 100 parts of the rubber in the tread stock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene rubber, styrene-isoprene-butadiene rubber, butadiene-isoprene rubber, polybutadiene, butyl rubber, neoprene, acrylonitrilebutadiene rubber (NBR), silicone rubber, the fluoroelastomers, ethylene acrylic rubber, ethylene-propylene rubber, ethylene-propylene terpolymer (EPDM), ethylene vinyl acetate copolymer, epicholrohydrin rubber, chlorinated polyethylene-propylene rubbers, chlorosulfonated polyethylene rubber, hydrogenated nitrile rubber, terafluoroethylene-propylene rubber, and the like.

Examples of reinforcing silica fillers which can be used in the vulcanizable elastomeric composition include wet silica (hydrated silicic acid), dry silica (anhydrous silicic acid), calcium silicate, and the like. Other suitable fillers include aluminum silicate, magnesium silicate, and the like. Among these, precipitated amorphous wet-process, hydrated silicas are preferred. Silica can be employed in the amount of about one to about 100 parts per hundred parts of the elastomer (phr), preferably in an amount of about 5 to 80 phr and, more preferably, in an amount of about 30 to about 80 phrs. The useful upper range is limited by the high viscosity imparted by fillers of this type. Some of the commercially available silica which can be used include, but are not limited to, HiSil® 190, HiSil® 210, HiSil® 215, HiSil® 233, HiSil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP0), and J. M. Huber Corporation.

Including surface functionalized nano-strings in silica containing rubber compositions can also decrease the shrinkage rates of such silica containing rubber compositions. Functionalized nano-particles may be compounded in silica compositions in concentrations up to about 30 wt % of the total composition, more preferably up to about 40 wt %, most preferably up to about 50 wt %.

The rubber can be compounded with all forms of carbon black, optionally additionally with silica. The carbon black can be present in amounts ranging from about one to about 100 phr. The carbon black can include any of the commonly available, commercially-produced carbon blacks, but those having a surface are of at least 20 m$^2$/g and, or preferably, at least 35 m$^2$/g up to 200 m$^2$/g or higher are preferred. Among useful carbon blacks are furnace black, channel blacks, and lamp blacks. A mixture of two or more of the above blacks can be used in preparing the carbon black products of the invention. Typical suitable carbon black are N-110, N-220, N-339, N-330, N-352, N-550, N-660, as designated by ASTM D-1765-82a.

Certain additional fillers can be utilized including mineral fillers, such as clay, talc, aluminum hydrate, aluminum hydroxide and mica. The foregoing additional fillers are optional and can be utilized in the amount of about 0.5 phr to about 40 phr.

Numerous coupling agent and compatibilizing agent are know for use in combining silica and rubber. Among the silica-based coupling and compatibilizing agents include silane coupling agents containing polysulfide components, or structures such as, for example, trialkoxyorganosilane polysulfides, containing from about 2 to about 8 sulfur atoms in a polysulfide bridge such as, for example, bis-(3-triethoxysilylpropyl) tetrasulfide (Si69), bis-(3-triethoxysilylpropyl) disulfide (Si75), and those alkyl alkoxysilanes of the such as octyltriethoxy silane, and hexyltrimethoxy silane.

It is readily understood by those having skill in the art that the rubber composition would be compounded by methods generally known in the rubber compounding art, such as mixing the various vulcanizable polymer(s) with various commonly used additive materials such as, for example, curing agents, activators, retarders and accelerators processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the sulfur vulcanizable and sulfur vulcanized material (rubbers), the additives mentioned above are selected and commonly used in the conventional amounts.

Specifically, the above-described nano-string containing rubber compounds are contemplated for use in rubber compounds used to make tire treads and side walls due to the enhanced reinforcement capabilities of the present nano-particles. The higher dynamic modulus (G') and its lower temperature dependence along with the lower hysteresis values at high temperature leads to the improved cornering, handling, dry, snow, and wet traction, rolling resistance, dispersion, and aging properties of the resultant tire compositions. Improved aging properties, thermal aging (high temperature), or mechanical aging (static or dynamic deformation cycles), include retention of the G' modulus, hysteresis, mechanical strengths, etc. Tin-functionalized nano-particles are especially suited for use in tire compositions. Nano-strings including a copolymer surface layer are also suitable for use in such tire compositions, because the longer copolymer chains in the surface layer leads to greater diffusion of the host rubber composition into the surface layer of the nano-string. Of course, the functionalized nano-string having a copolymer surface layer, i.e., the combination of the two alternatives may be most beneficial.

ENGINEERING PLASTICS AND OTHERS

Similarly, the nano-strings can be added into typical plastic materials, including polyethylene, polypropylene, polystyrene, polycarbonate, nylon, polyimides, etc. to for example, enhance impact strength, tensile strength and damping properties.

Of course, the present inventive nano-strings are also suited to other presently existing applications for nano-strings, including the medical field, e.g. drug delivery and blood applications, information technology, e.g. quantum computers and dots, aeronautical and space research, energy, e.g., oil refining, and lubricants.

ENGINE MOUNT, ETC.

Another application for such rubbers is in situations requiring superior damping properties, such as engine mounts and hoses (e.g. air conditioning hoses). Rubber compounds of high mechanical strength, super damping properties, and strong resistance to creep are demanded in engine mount manufacturers. In engine mounts, a rubber, because it sits most of its life in a packed and hot position, requires very good characteristics. Utilizing the nano-strings within selected rubber formulations can improve the characteristics of the rubber compounds.

The present invention now will be described with reference to non-limiting examples. The following examples and tables are presented for purposes of illustration only and are not to be construed in a limiting sense.

EXAMPLES

Preparation of Polymers

A 7.6 L reactor equipped with external jacked heating and internal agitation was used for all polymerizations. 1,3-Butadiene was used as a 22.0 weight percent solution in hexane. Styrene was used as a 33 wt. % solution in hexane, and n-butyllithium was used as a 15 M solution in hexane. Technical grade divinylbenzene (DVB, 80% as a mixture of isomers, Aldrich) was passed through a column of inhibitor remover under $N_2$ before use.

Example 1
Preparation of Polymer Nano-Strings

The reactor was charged with 1.2 kg of 22% butadiene and heated to 57° C. After the temperature had stabilized, polymerization was initiated with 10.2 mL of a 1.5 M butyllithium/hexane solution. The batch temperature was maintained at 57° C. for the duration of the polymerization. After 2 hours, the reactor was charged with 1.8 kg of 33% styrene. After an additional 2 hour reaction time, the reactor was charged with 140 mL of divinylbenzene. After 10 minutes, the agitation was stopped and the temperature was maintained at 57° C. for an additional 2 hours. The reactor was then discharged and the product was dropped into a 95:5 acetone: isopropanol bath and the product was dried.

Figure 2:
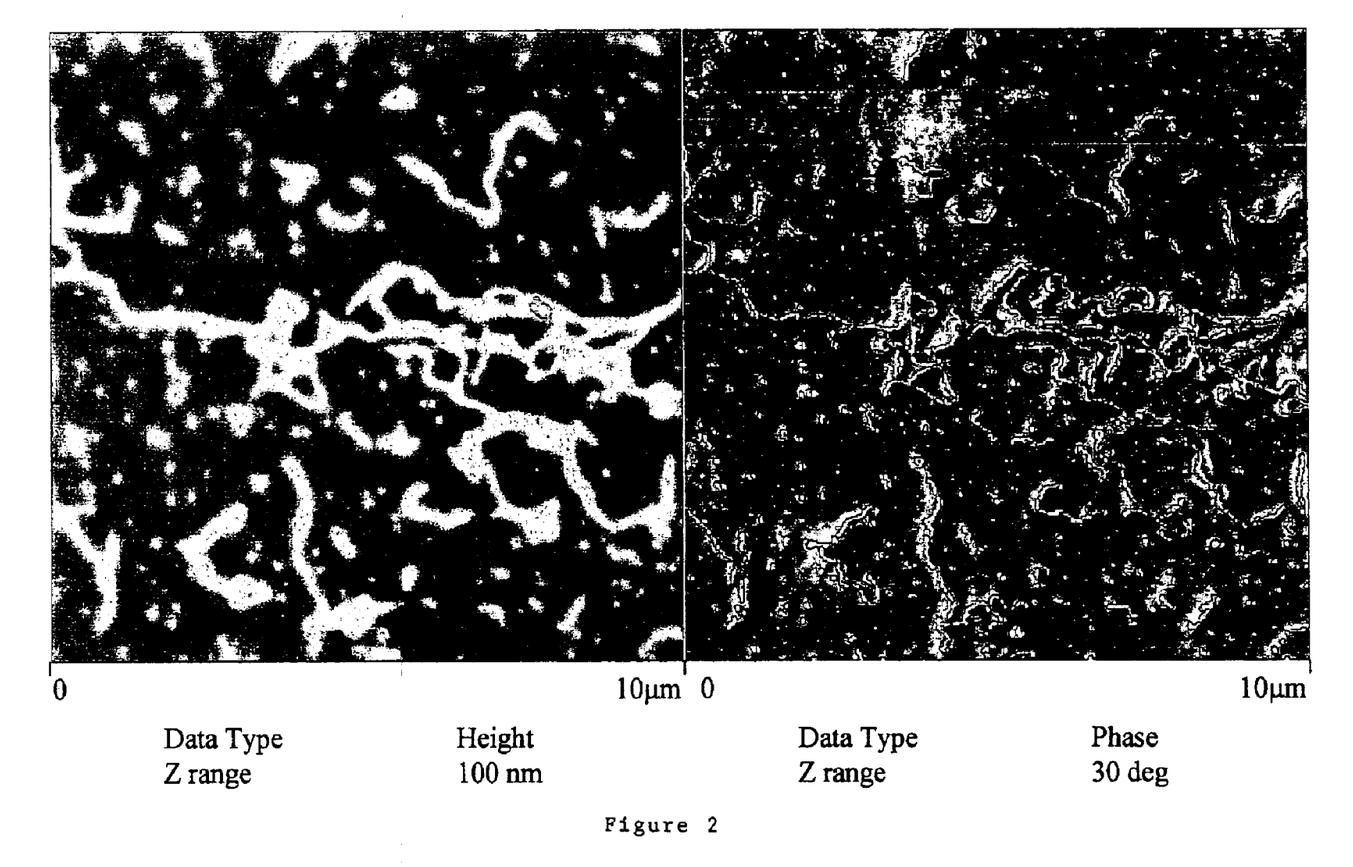
FIG. 2 is an atomic force microscopy photograph of polymer nano-strings, on a mica-surface, produced according to the present invention.
Figure 3:
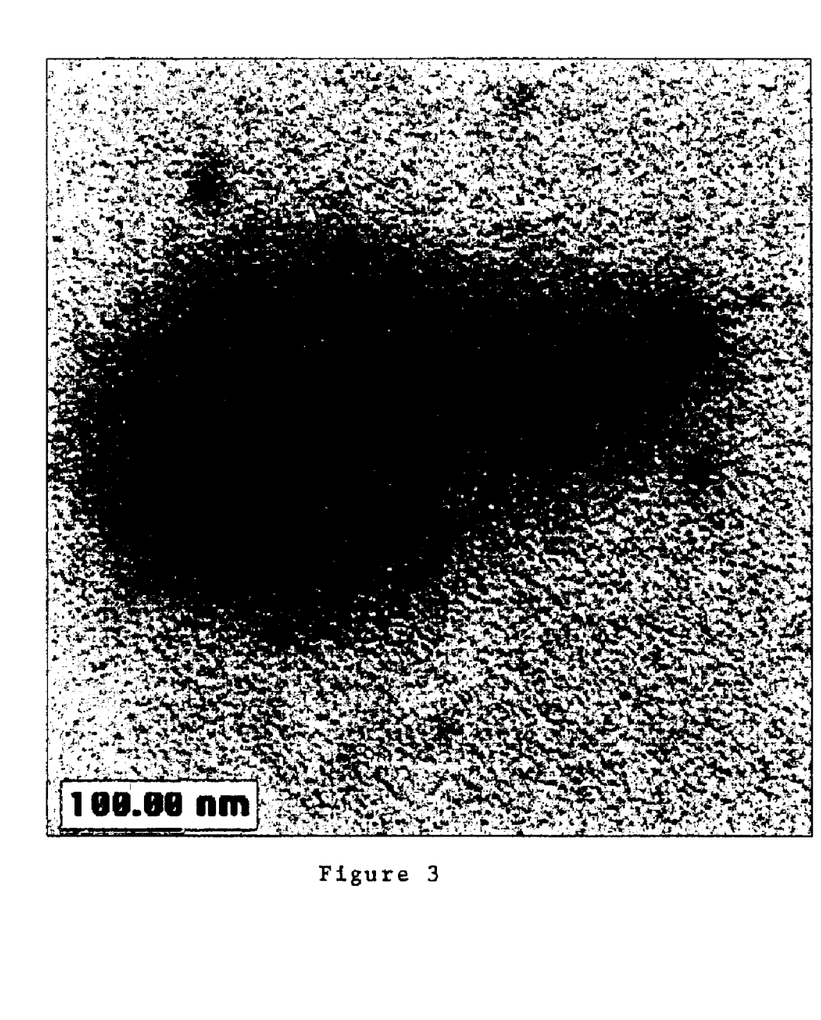
FIG. 3 is a transmission electron microspcopy photograph of a single polymer nano-string produced according to the present invention.
Figure 4:
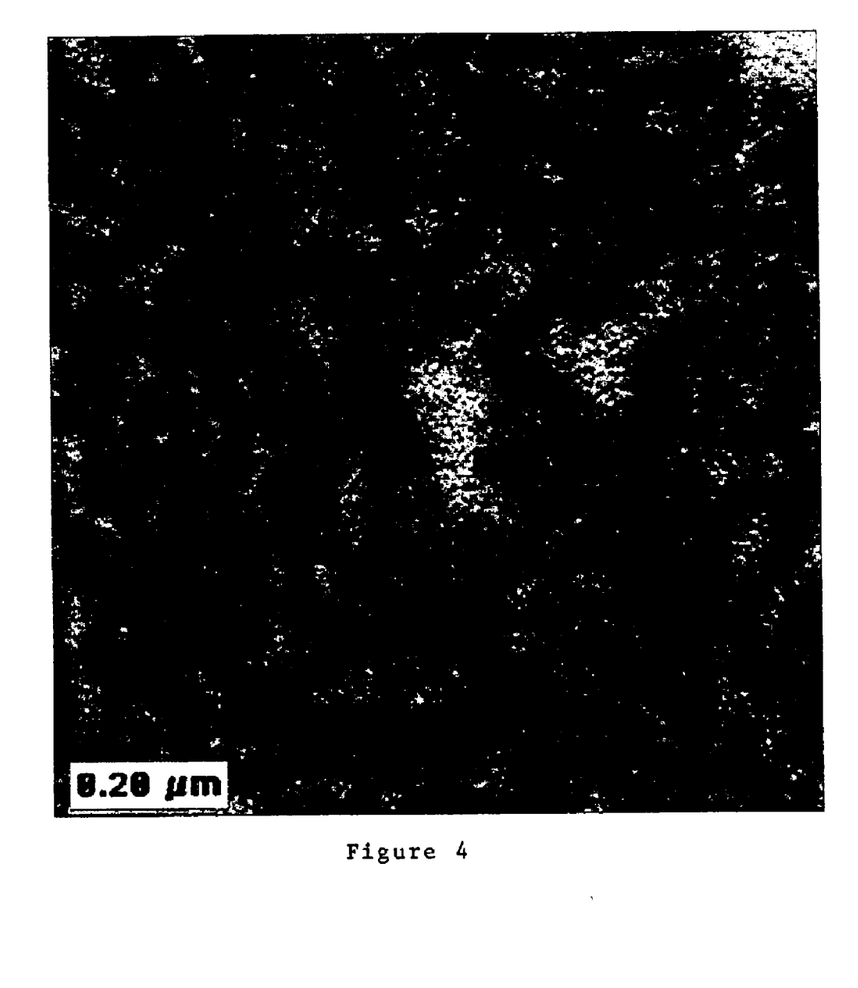
FIG. 4 is a transmission electron microscopy photograph of multiple tangled nano-strings produced according to the present invention.

GPC analysis showed that before adding the DVB, the intermediate polymer had a $M_w$ of about 46,744. The polydispersity of the segment was about 1.08. The final product was delaminated by transmission electron microscopy (TEM). For TEM analysis, about 10 mL of solution was taken from the batch and further diluted with the hexane solvent to about $10^{-4}$ wt %. A drop of the diluted solution was then coated on a graphed copper micro-screen and the solvent was evaporated. The screen was then examined by TEM. The results showed that the product was composed of polymer nano-strings. The diameter of the nano-strings was about 20 nm. The length of the nano-strings ranged from about 0.1 to 20 μm. More particularly, FIG. 2 shows the nano-strings via atomic force microscopy on a mica surface. FIG. 3 shows a single nano-string via electron microscopy and FIG. 4 shows multiple tangled nano-strings via electron microscopy.

Examples 2–4
Application of Polymer Nano-strings in Rubber Compositions

Two kinds of rubber compositions were prepared according to the formulation shown in Tables 1 and 2 by selectively using the synthesized nano-strings to replace the amount of polubutadiene in the compound formulation (i.e., example 3) or by adding the synthesized nano-strings directly into the compound (i.e., example 2). One control was used (i.e., example 4) for setting up a comparison with the test compounds. In each sample, a blend of the ingredients was kneaded by a method listed in Table 3. The final stock was sheeted and molded at 160° C. for 30 minutes.

On the vulcanized rubber compounds of Examples 2–4, measurement of the tensile strength, tear strength, hysterisis loss gave the results as shown in Table 4. Measurement of tensile strength is based on conditions of ASTM-D 412 at 22° C. Test specimen geometry was taken in the form of a ring of a width of 0.125 cm and a thickness of 0.191 cm. The specimen tested at a specific gauge length of 2.54 cm. The measurement of tear strength is based on conditions of ASTM-D 624 at 170° C. Test specimen geometry was taken in the form of a nicked ring (ASTM-624-C). The specimen was tested at the specific gauge length of 4.45 inches. The hysteresis loss was measured with a Dynastat Viscoelastic Analyzer. Test specimen geometry was taken in the form of a strip of a length of 30 mm and of a width of 15 mm. The following testing conditions were employed: frequency 5 Hz, 2% strain. Measurement of the wet traction (Stanley London) was performed on the British Portable Skid Tester [see the *Road Research Laboratory Technical Paper No. 66* by C. G. Giles et al. London, (1966)]. The sample geometry for the test is a rectangle bar of 2.54×7.62×0.64 cm.

As can be seen in the Table 4, the rubber composition of examples 2 and 3 exhibited well balanced physical properties. The tensile strength and the tear strength of the modified rubber compounds are better than that of the comparative compounds (i.e., Example 4) under equal modulus condition. The dynamic modulus measurements of examples 2 and 3 are much higher than that of the control, indicating that the test compounds possess improved traction.

TABLE 1

Composition for Master Batch

| component | pbw |
|---|---|
| Polybutadiene | 100.00 |
| Carbon Black (N343) | 50.00 |
| Aromatic Oil | 15.00 |
| Zinc Oxide | 3.00 |
| Hydrocarbon Resin (tackifiers) | 2.00 |
| Santoflex 13 (antioxidants) | 0.95 |
| Stearic Acid | 2.00 |
| Wax | 1.00 |

TABLE 2

Composition for Final Batch

| additional component added to Master Batch | pbw |
|---|---|
| Sulfur | ~1.30 |
| Cyclohexyl-benzothiazole sulfenamide (accelerator) | 1.40 |
| Diphenylguanidine (accelerator) | 0.20 |

TABLE 3

Mixing Conditions

| Mixer: 300 g Brabender | Agitation Speed: 60 rpm |
|---|---|
| Master Batch Stage | |
| Initial Temperature | 110° C. |
| 0 min | charging polymers |
| 5.0 min | Drop |
| Final Batch Stage | |
| Initial Temperature | 75° C. |
| 0 sec | Charging master stock |
| 30 sec | Charging curing agent and accelerators |
| 75 sec | Drop |

TABLE 4

A Summary on the Experimental Results

| | Example 2 | Example 3 | Example 4 (comparative) |
|---|---|---|---|
| Nano-string (example 1) (pbw) | 10 | 10 | 0 |
| polybutadiene (pbw) | 100 | 90 | 100 |
| carbon black (pbw) | 50 | 50 | 50 |
| aromatic oil (pbw) | 15 | 15 | 15 |
| 130° C. ML4 | 40.79 | 42.11 | 41.58 |
| Shore A 22° C. (3 sec) | 60.5 | 64.5 | 58.7 |
| Shore A 100° C. (3 sec) | 56.4 | 59.9 | 58.1 |

TABLE 4-continued

A Summary on the Experimental Results

|  | Example 2 | Example 3 | Example 4 (comparative) |
|---|---|---|---|
| Ring Tensile Test 23° C. | | | |
| Tb (kPa) | 11,830 | 14,214 | 12,402 |
| Eb (%) | 484 | 464 | 410 |
| M300 | 880 | 1128 | 1125 |
| M50 | 171 | 203 | 165 |
| 100° C. | | | |
| Tb (kPa) | 5,650 | 6,670 | 6,738 |
| Eb (%) | 484 | 464 | 410 |
| M300 | 690 | 863 | |
| M50 | 120 | 138 | 149 |
| Strength (kg/cm) | 342 | 358 | 337 |
| Ring Tear travel (%) | 482 | 416 | 359 |
| 170° C. | | | |
| Tg of Compound (° C.) | −77 | −75 | −75 |
| Stanley London (concrete) | 46 | 48 | 47 |
| Dynastat | | | |
| M' 50° C. | 10.8240 | 13.519 | 7.8638 |
| tan δ 50° C. | 0.21772 | 0.21681 | 0.15379 |
| M' 23° C. | 14.019 | 18.118 | 8.9348 |
| tan δ 23° C. | 0.23054 | 0.22521 | 0.18035 |
| M' 0° C. | 17.103 | 22.762 | 10.519 |
| tan δ 0° C. | 0.24068 | 0.23099 | 0.20378 |
| M' −20° C. | 21.512 | 28.977 | 11.785 |
| tan δ −20° C. | 0.24679 | 0.22815 | 0.23035 |

The invention has been described with reference to the exemplary embodiments. Modifications and alterations will occur to others upon reading and understanding the specification. The invention is intended to include such modifications and alterations insofar as they come within the scope of the disclosure and claims.

I claim:

1. A nano-string composition comprising:
    a. a poly(alkenylbenzene) core, and
    b. a surface layer comprising poly(conjugated diene), poly(alkylene), or mixtures thereof wherein said nano-string has a mean average diameter of less than about 100 nm and an average length of between about 1 and 1000 μm and wherein said length is greater than said diameter.

2. The composition of claim 1 further including at least one functional group.

3. The composition of claim 2 wherein said functional group is associated with the surface layer.

4. The composition of claim 1 wherein said surface layer further includes vinyl-substituted aromatic hydrocarbon monomer units.

5. The composition of claim 4 wherein said surface layer comprises a diblock polymer.

6. The composition of claim 1 wherein said core is cross-linked.

7. The composition of claim 5 wherein said core comprises substantially a mono-block polymer.

8. The composition of claim 7 wherein said mono-block polymer chains and said diblock copolymer chains are cross-linked.

9. A nano-string composition comprising:
    a. a poly(alkenylbenzene) core, and
    b. a polyalkylene surface layer comprising at least one alkylene contributed monomer unit, wherein said nano-string has a mean average diameter of less than about 100 nm and a length of between greater than about 1 and 1000 μm.

10. The composition of claim 9 wherein said surface layer includes a functional group.

11. The composition of claim 9 wherein said polyalkylene surface layer includes monomer units selected from the group consisting of polyethylene, polypropylene, and mixtures thereof.

12. The composition of claim 9 wherein said polyalkylene surface layer further includes at least one alkenylbenzene monomer unit.

13. The composition of claim 9 further comprising a crosslinking agent.

14. A rubber composition comprising:
    a. a rubber, and
    b. a polymer nano-string including a poly(alkenylbenzene) core and a surface layer comprising monomer units including conjugated dienes, alkylenes, and mixtures thereof, wherein said polymer nano-string has a mean-average diameter less than about 100 nm and a length between about 1 and 1000 μm.

* * * * *